US012659582B2

(12) United States Patent (10) Patent No.: US 12,659,582 B2
Lin et al. (45) Date of Patent: Jun. 16, 2026

(54) HIGH SPEED MULTI-FOCAL CAMERA

(71) Applicant: Dell Products L.P., Round Rock, TX (US)

(72) Inventors: Yi-Hsien Lin, Taipei City (TW); Chih-Hao Kao, Singapore (SG); Ghee Beng Ooi, Singapore (SG)

(73) Assignee: Dell Products L.P., Round Rock, TX (US)

( * ) Notice: Subject to any disclaimer, the term of this patent is extended or adjusted under 35 U.S.C. 154(b) by 77 days.

(21) Appl. No.: 18/765,464

(22) Filed: Jul. 8, 2024

(65) Prior Publication Data

US 2026/0012703 A1    Jan. 8, 2026

(51) Int. Cl.
*H04N 23/67* (2023.01)
*H04N 23/52* (2023.01)
*H04N 23/611* (2023.01)

(52) U.S. Cl.
CPC ........... *H04N 23/671* (2023.01); *H04N 23/52* (2023.01); *H04N 23/611* (2023.01); *H04N 23/672* (2023.01); *H04N 23/673* (2023.01)

(58) Field of Classification Search
CPC .... H04N 23/671; H04N 23/52; H04N 23/611; H04N 23/672; H04N 23/673
See application file for complete search history.

(56) References Cited

U.S. PATENT DOCUMENTS 7,236,306 B2    6/2007    Janson, Jr. et al.
7,256,944 B2    8/2007    Labaziewicz et al.

11,082,606 B1    8/2021    Gamadia et al.
11,750,922 B2    9/2023    Dhanda et al.
11,953,755 B2    4/2024    Baer et al.
2022/0116544 A1*    4/2022    Gamadia ................ H04N 23/90
2022/0116545 A1*    4/2022    Feng .................... H04N 23/80
2022/0236384 A1    7/2022    Sutton et al.
2023/0319429 A1*    10/2023    Wang .................. H04N 17/002
                                                                        348/133

FOREIGN PATENT DOCUMENTS

WO    WO-2021072648 A1 *    4/2021    ............... G03B 3/10

OTHER PUBLICATIONS

SLR Lounge, "How Phase Detection Autofocus Works," downloaded from https://www.slrlounge.com/dslr-auto-focus-actually-work/ on Jul. 5, 2024, 12 pages.
Tech Insights, "Apple's newest iPhone Three Camera System is Cam-packed," downloaded from https://www.techinsights.com/blog/apple-iphone-14-image-sensor-preliminary-analysis on Jul. 5, 2024, 11 pages.

* cited by examiner

*Primary Examiner* — Timothy J Henn
(74) *Attorney, Agent, or Firm* — Zagorin Cave LLP; Robert W. Holland

(57)    ABSTRACT

A camera captures a visual image of an object in a rapid manner by determining a distance to the object with a time-of-flight sensor and looking up an actuator position for actuating the camera lens to a focus based upon the distance. The actuator position set by the look up table adjusts for temperature effects on focus based upon a temperature measurement associated with the lens. Visual image capture may be accomplished without image-based focus analysis, such as contrast and phase detection autofocus, by validating the distance captured with the time-of-flight sensor.

18 Claims, 6 Drawing Sheets

| | DoF TABLE | | DoF RANGE | |
|---|---|---|---|---|
| | OBJECT DISTANCE (METER, m) | LENS SHIFT (MILLIMETER, mm) | NEAR FIELD (METER, m) | FAR FIELD (METER, mm) |
| | 0.1 | 0.218 | 0.097 | 0.104 |
| A | 0.2 | 0.106 | 0.187 | 0.215 |
| | 0.3 | 0.070 | 0.271 | 0.335 |
| B | 0.4 | 0.053 | 0.351 | 0.466 |
| | 0.5 | 0.042 | 0.425 | 0.607 |
| C | 0.6 | 0.035 | 0.495 | 0.761 |
| | 0.7 | 0.030 | 0.561 | 0.930 |
| | 0.8 | 0.026 | 0.623 | 1.116 |
| | 0.9 | 0.023 | 0.683 | 1.321 |
| D | 1.0 | 0.021 | 0.738 | 1.549 |
| | 1.1 | 0.019 | 0.791 | 1.803 |
| | 1.2 | 0.017 | 0.842 | 2.089 |
| | 1.3 | 0.016 | 0.890 | 2.412 |
| | 1.4 | 0.015 | 0.935 | 2.781 |
| | 1.5 | 0.014 | 0.979 | 3.206 |
| | 1.6 | 0.013 | 1.021 | 3.702 |
| | 1.7 | 0.012 | 1.060 | 4.286 |
| | 1.8 | 0.012 | 1.098 | 4.986 |
| E | 1.9 | 0.011 | 1.135 | 5.838 |
| | 2.0 | 0.010 | 1.169 | 6.900 |
| | 3.0 | 0.007 | 1.452 | INFINITY |

FIG. 3

100 — VALIDATE RANGE INFORMATION

102 — RECEIVE COMMAND TO CAPTURE IMAGE

104 — SET FOCAL POINT BASED ON RANGE

106 — ESTIMATE DoF RANGE POSITION

108 — CONFIRM FOCUS WITH IMAGE SENSOR LOGIC IN DIRECTION OF ESTIMATE RANGE POSITION

FIG. 6

HIGH SPEED MULTI-FOCAL CAMERA

BACKGROUND OF THE INVENTION

Field of the Invention

The present invention relates in general to the field of information handling system cameras, and more particularly to an information handling system high speed multi-focal camera.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. For example, a main housing portion integrates processing components and a keyboard and rotationally couples with hinges to a lid housing portion that integrates a display. In clamshell configuration, the lid housing portion rotates approximately ninety degrees to a raised position above the main housing portion so that an end user can type inputs while viewing the display. After usage, convertible information handling systems rotate the lid housing portion over the main housing portion to protect the keyboard and display, thus reducing the system footprint for improved storage and mobility.

One common function of portable information handling systems is to support videoconferencing with a camera included in the information handling system housing. A typical integrated camera has a limited size to fit into the housing so that the lens is typically placed relatively close to the image sensor. At longer distances to an object, such as greater than two meters, the camera can typically focus to infinity and capture the object with clarity. At shorter distances, an actuator, such as a step motor or voice coil motor (VCM), moves the camera lens relative to the camera image sensor to focus the camera on an object. Conventional focus logic uses analysis of a captured image with adjustments to the lens position to determine when an object is in focus so that an image can be captured. One technique for autofocus is contrast detection auto focus (CDAF), which analyzes contrast at object borders to find focus on the object. A difficulty with CDAF is that the time to find focus can exceed several seconds while the camera image signal processor (ISP) analyzes the captured image information for contrast. Another technique for autofocus is phase detection auto focus (PDAF), which analyzes whether multiple images generated by prisms line up or are in phase with each other. PDAF determines focus more quickly than CDAF but has an increase cost and size due to the prisms that split the image for phase analysis. Both CDAF and PDAF have delays in sensing focus in part because the lens actuator has to increment through different focus ranges to compare images captured at the different focus ranges.

SUMMARY OF THE INVENTION

Therefore, a need has arisen for a system and method which automatically focuses a camera in a rapid manner.

In accordance with the present invention, a system and method are provided which substantially reduce the disadvantages and problems associated with previous methods and systems for automatically focusing a camera. A camera detects distance to an object with a sensor, such as a time-of-flight sensor, and applies the distance to a focal point lookup table to set an actuator position based on the distance that focuses the camera for the distance.

More specifically, an information handling system processes information with a processor and memory that cooperate to execute instructions, such as videoconferencing application. A camera captures visual images with a lens that focuses a camera field of view on an image sensor managed by an image signal processor (ISP). A distance sensor, such as a time-of-flight sensor, detects a distance from the camera to an object in the camera field of view and the ISP uses the distance to look up an actuator position for focus of the lens based upon the distance. The actuator is commanded to the actuator position associated with focus so that a visual image is captured in a rapid manner without having to perform image-based focus analysis, such as CDAF or PDAF.

The present invention provides a number of important technical advantages. One example of an important technical advantage is that a camera is rapidly focused on an object in the camera field of view by reference to a sensed distance so that delays associated with image-based analysis are avoided or reduced. Validation of the sensed distance and associated focus actuator position help to ensure that quality images are captured in a rapid and accurate manner.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 depicts an example focal point table that defines actuator positions associated with focus for distances detected by a time-of-flight sensor;

FIG. 6 depicts a camera depth of field to reference for adjustment of a camera lens actuator position with image based analysis.

DETAILED DESCRIPTION

An information handling system camera rapidly focuses on an object by applying distance information to the object determined by a distance sensor, such as a time-of-flight sensor. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
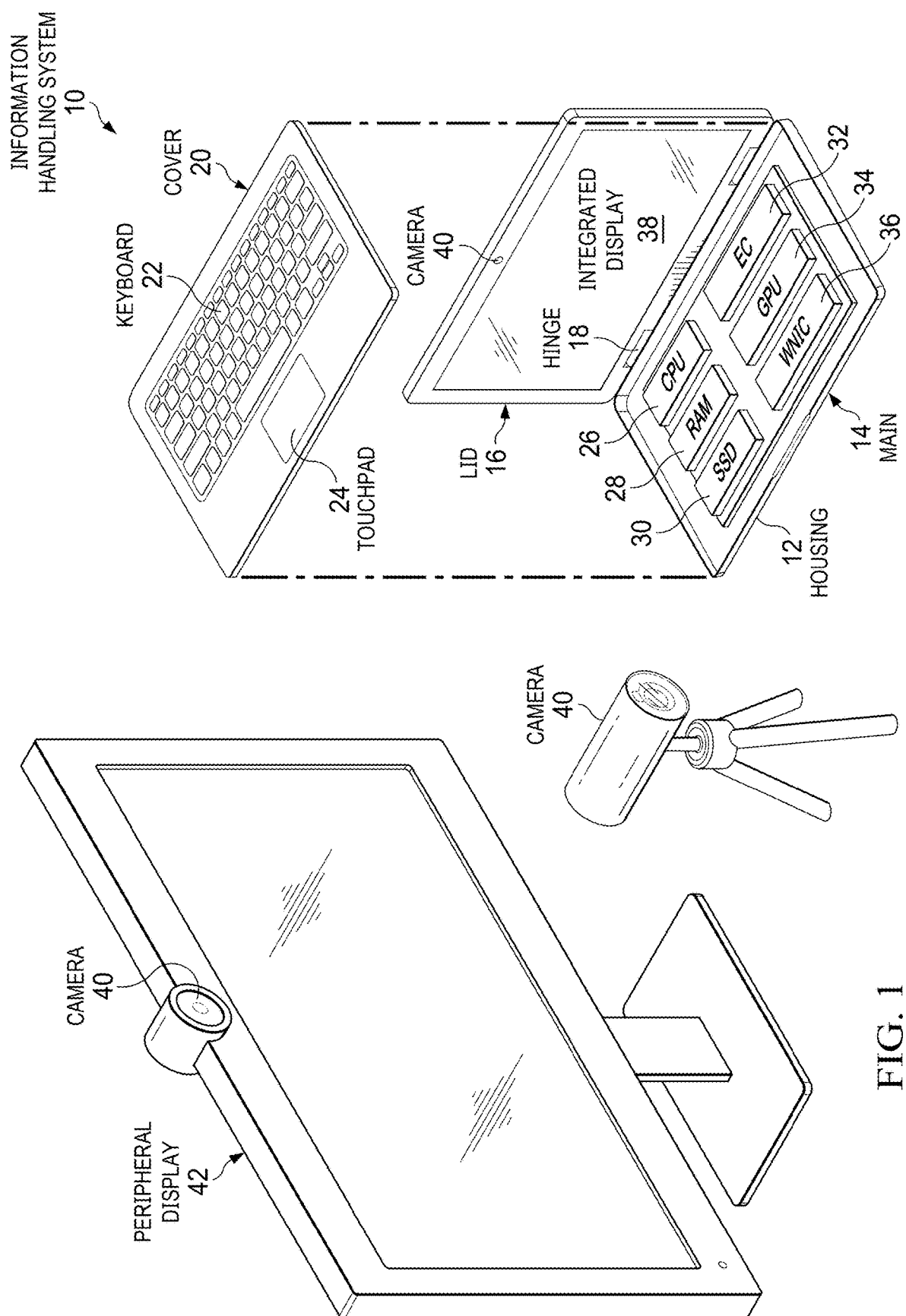
FIG. 1 depicts an exploded perspective view of an information handling system having various embodiments of cameras that capture visual images.

Referring now to FIG. 1, an exploded perspective view of an information handling system 10 depicts various embodiments of cameras 40 that capture visual images. In the example embodiment, information handling system 10 is built in a portable housing 12 having a main portion 14 rotationally coupled with a lid portion 16 by a hinge 18 to rotate between open and closed positions. A cover portion 20 couples over main portion 14 to support a keyboard 22 and touchpad 24 that accept end user inputs. A central processing unit (CPU) 26 couples to a motherboard in main portion 14 to execute instructions that process information in cooperation with a random access memory (RAM) 28 that stores the instructions and information. A solid state drive (SSD) 30 has persistent storage to store information and instructions during power down states, such as an operating system and applications that are retrieved to RAM 28 for execution by CPU 26. An embedded controller 32 manages physical operating conditions at the information handling system, such as application of power, thermal constraints and interactions with input/output devices like keyboard 22 and touchpad 24. A graphics processing unit (GPU) 34 processes information to generate visual images defined by an array of pixel values for presentation at an integrated display 38 included in lid portion 16 and a peripheral display 42. A wireless network interface controller 36 manages network and peripheral communications, such as through WIFI and BLUETOOTH. In the example embodiment, a camera 40 couples to lid portion 16 to capture visual images of an end user viewing integrated display 38. Another camera 40 couples to peripheral display 42 to capture visual images of an end user viewing the peripheral display. A peripheral camera 40 operates separate from information handling system 10 and peripheral display 42 to capture visual images based upon its position in a work area. In alternative embodiments, other types of cameras may be used as described below.

Figure 2:
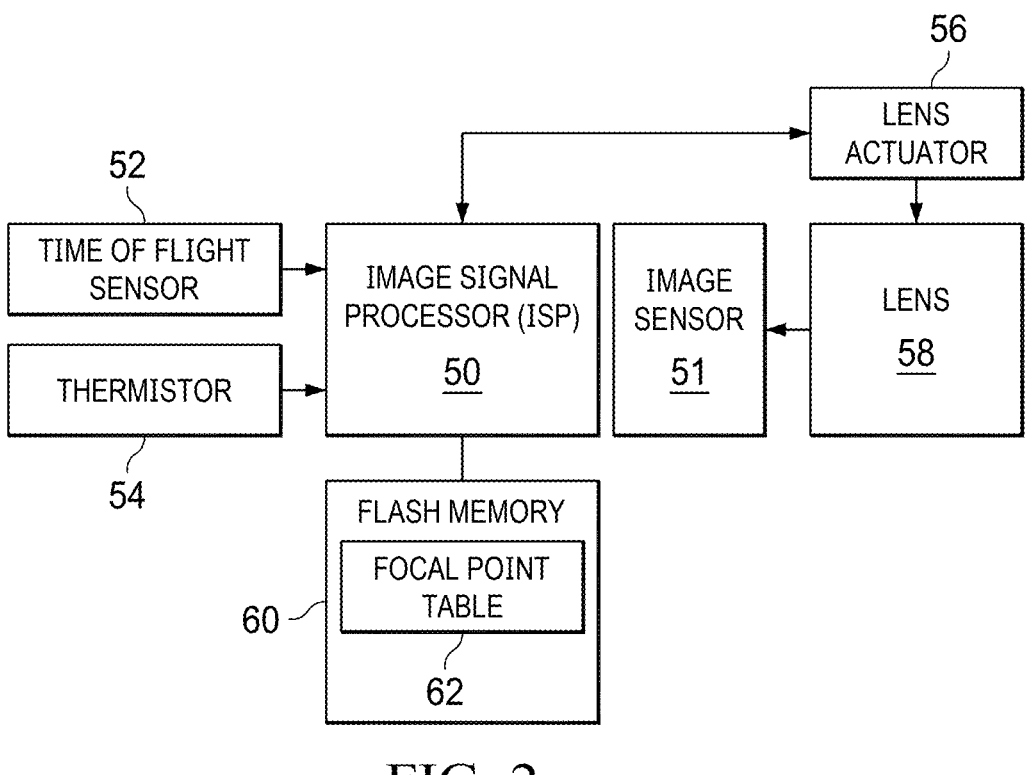
FIG. 2 depicts a block diagram of operational elements of a camera that cooperate to capture visual images with a rapid focus response.

Referring now to FIG. 2, a block diagram depicts operational elements of a camera that cooperate to capture visual images with a rapid focus response. In the example embodiment, an image signal processor (ISP) 50 executes instructions stored in a non-transitory flash memory 60 to manage capture of visual images of light accepted through a lens 58 and directed at an image sensor 51. ISP 50 processes the image sensor information to define the captured visual image as an array of pixel values having a resolution set by the amount of pixels of image sensor 51. The light directed through lens 58 is focused by adjusting a distance between lens 58 and image sensor 51 with an actuator, such as a voice coil motor (VCM) or a step motor. ISP 50 includes logic stored in the non-transitory memory that executes to perform image-based focus, such as CDAF and/or PDAF. Image based focus analyzes image uses the image information to determine when objects are in focus. For instance, contrast detection (CDAF) compares the contrast at different focuses to have a sharp contrast when an object is in focus relative to when the object is not in focus. Both CDAF and PDAF compare visual images captured at increments to find the increment with the best focus result; however, the incremental image capture and processing tend to slow the autofocus process. To reduce the time needed for focus of lens 58 by actuator 56, ISP 50 retrieves distance information from a distance sensor, such as a time-of-flight sensor 52, and applies the distance to an object to a focal point table 62 that has a lens actuator position for the distance detected by time-of-flight sensor 52. ISP 50 also accepts a temperature measurement from a thermistor 54 or other thermal sensor to adjust the actuator position selected from the focal point table 62 to correct for the sensed temperature.

In one example embodiment, ISP 50 detects a distance from time-of-flight sensor 52 and commands capture of a visual image by setting lens actuator 56 to an actuator position without any image based analysis, such as CDAF or PDAF. The direct command to an actuator position and capture of a visual image without any image-based analysis provides a rapid autofocus and image capture with a lens focus set by distance information from a different sensor. Once the image is captured, ISP 50 can perform additional analysis on the image data if desired, such as to determine whether the image quality is adequate and if additional time is available to perform image-based analysis that could yield a better image quality. In addition to image analysis, other validation of the focus distance may be performed to ensure adequate image quality. Validation can use a variety of factors based upon the context at the camera when the image is captured, such as the amount of the focal view included in the distance measured by the time-of-flight sensor and variations in the field of view that indicate facial features. For example, the time-of-flight sensor produces an infrared illumination with a field of view that is more narrow than the camera field of view and is scanned to different positions within the camera field of view. Variations in the timing of reflections can indicate facial features, such as nose, eye sockets, ears etc. . . . In contrast, a flat surface might indicate a reflective surface and a weak or non-existent infrared reflection might indicate a distance of greater than the sensing capability of the time-of-flight sensor. In one embodiment, user presence is detected by a time-of-flight sensor that detects slight changes in distance to an object, which shows a user in present and moving in position slightly relative to the camera. A user presence detection may be used as a context that allows a focus distance to be set without reference to image analysis. The camera context to validate focus distance can include previous visual images captured by the camera and distances sensed with the capture of those visual images. For instance, an image of a face captured by the camera that has a similar distance measurement in a limited time period validates subsequent pictures taken by the camera. When the sensed distance is not validated, the camera can instead rely upon image-based analysis and then use the sensed distance for validation of subsequent pictures. In one alternative embodiment, other types of distance sensors may be used, such as LIDAR sensors.

Referring now to FIG. 3, an example focal point table defines actuator positions associated with focus for distances detected by a time-of-flight sensor. In the example embodiment, five predefined object distances of 0.2, 0.4, 0.5, 1.0 and 1.9 M are used to cover a focal field of 0.18 M to 5.8 M. These example settings encompass normal operational conditions of webcam use cases, such as to support a videoconference with a camera included in a portable information handling system housing lid portion. The predefined lens shift values are translated to VCM step data and stored as a mapping table in camera nonvolatile memory. The VCM jumps to the step associated with a distance when the distance is detected by a time-of-flight or similar distance sensor. Thermal adjustments to the VCM steps are defined for different thermal conditions that alter the focus characteristics of the camera lens. Although the example embodiment uses five predefined VCM step values for an f1.8 camera, fewer step values may be used with a smaller lens aperture, such as f2.7, and a greater number of step values may be used with a larger lens aperture.

Figure 4:
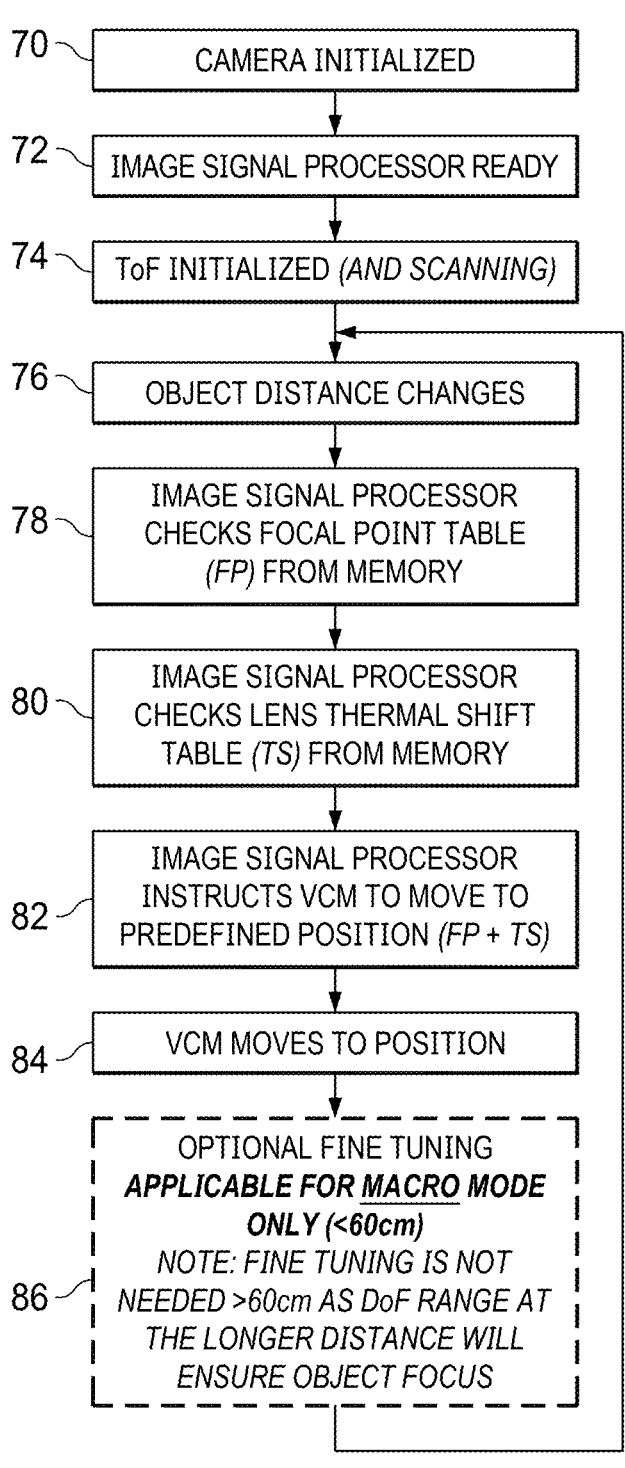
FIG. 4 depicts a flow diagram of a process for managing camera focus to capture a visual image with distance information and without image-based processing.

Referring now to FIG. 4, a flow diagram depicts a process for managing camera focus to capture a visual image with distance information and without image-based processing. The process starts at step 70 with camera initialization and at step 72 the ISP is ready to process visual images. At step 74 a time-of-flight sensor is initialized to detect distances to objects in the camera field of view. In one embodiment, the time-of-flight sensor may monitor the camera field of view to prepare the camera for focus before the camera receives a picture command from an end user. The monitoring may vary based upon context so that more active monitoring is performed when camera context indicates an increased probability of a picture being taken, such as an orientation of the housing detected by an accelerometer. At step 76 the object distance is check periodically to detect changes in the object distance. When an object distance is detected, the process continues to step 78 for the ISP to reference the focal point table from the nonvolatile memory and determine a focus actuator position. At step 80, the ISP checks the lens thermal shift table in the focal point table to determine an adjustment for the thermal conditions measure in the camera. At step 82, the ISP instructs the focus actuator, such as a VCM, to move the lens to a predefined actuator location based upon the distance and the thermal conditions. At step 84 the lens actuator, such as a VCM, moves the actuator to the determined actuator position so that the camera is ready to take the picture when the end user commands without performing image-based analysis. At step 86 optional fine tuning may be performed to improve the quality of the visual image. For instance, at sensed distances of less than 60 CM contrast detection autofocus may be employed to sharpen the visual image. Once focus is set, if the distance changes, the process returns to step 76 to adjust focus for the new distance.

Figure 5:
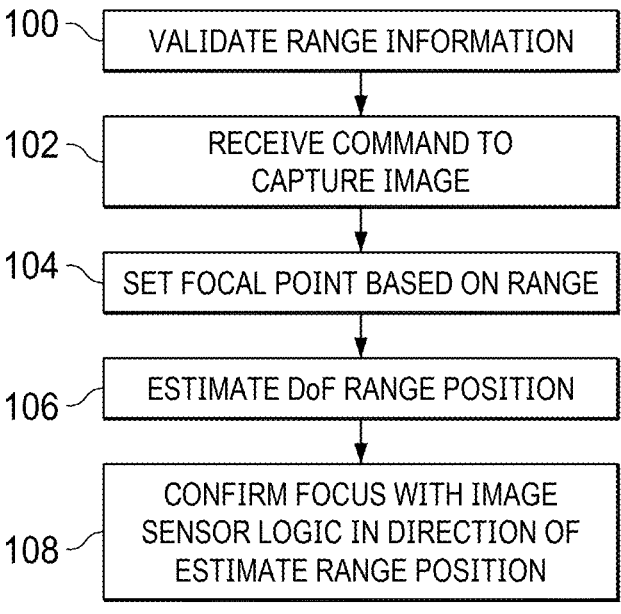
FIG. 5 depicts a flow diagram of a process for managing focus of a camera by a camera actuator position associated with a distance sensed by a distance sensor, such as a time-of-flight sensor.

Referring now to FIG. 5, a flow diagram depicts a process for managing focus of a camera by camera actuator position associated with a distance sensed by a distance sensor, such as a time-of-flight sensor. The process starts at step 100 with validation of range information detected by the distance sensor to an object in the camera field of view. The validation may involve a comparison of sensed distance information against predefined indications of a valid object in the field of view, such as a size of the object, a location of the distance scan, movement of the object similar to a user presence indication, or other context. In some instances, the validation may involve a comparison of distance information with visual image information, such as correspondence of the distance scan location and an object shown in the visual image or a change of contrast in the visual image from an initial capture and an image capture at a focus based upon the distance. At step 102 a command is received from an end user to capture the visual image with the camera. At step 104 the focal point of the camera is set based upon the distance in the focal point table and its associated actuator position. At step 104 an image may be completed without image based analysis, however, additional rapid steps may be taken to help confirm the camera focus. At step 106, an estimate of the depth of field range position for the commanded actuator position is considered versus the actual actuator and/or lens position associated with complete focus. At step 107, the focus is confirmed with the image sensor based logic by incrementing focus towards an in-focus actuator position, as is illustrated below.

Figure 6:
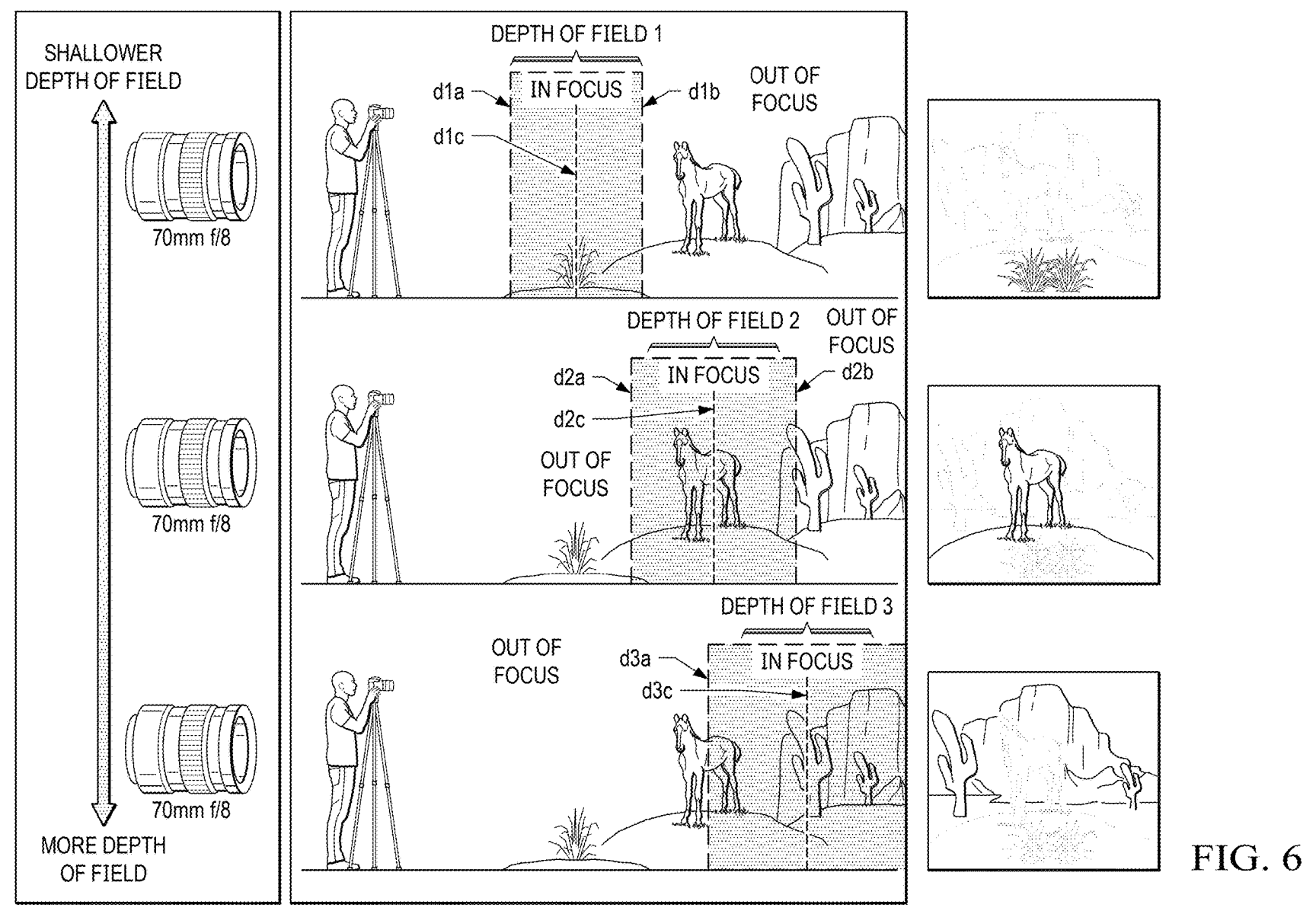

Referring now to FIG. 6, a camera depth of field is depicted to reference for adjustment of a camera lens actuator position with image based analysis. An object in focus with a lens has a range of a depth of field in which slight inaccuracies of focus do not have a meaningful impact on the quality of an image captured by the camera. The depth of focus range is wider as distance to the object increases so that image-based analysis is more likely to have a meaningful increase in the quality of the image captured at shorter distances, such as 60 cm or less. FIG. 6 shows three objects at different distances and the size of the depth of focus range for each object. At greater distances such as d3c, an infinite camera focus captures visual images with an acceptable quality from d3a to d3b. The ideal focus distance for each object, shown as d1c, d2c and d3c, has a smaller range with shorter distances so that accurate focus is more important. To accomplish rapid focus as described above and achieve an accurate image, the initial actuator position is set within the depth of field but on the near side of in focus, such as at d1a when the distance for focus indicates d1c. An image is captured and the actuator is incremented in the direction of an expected better focus so that an image captured at the incremented actuator position confirms improved focus. In various embodiments, other types of incrementing may be performed around the expected in focus position to confirm the distance-selected actuator position before a visual image is captured.

Although the present invention has been described in detail, it should be understood that various changes, substitutions and alterations can be made hereto without departing from the spirit and scope of the invention as defined by the appended claims.

What is claimed is:

1. An information handling system comprising:
a processor operable to execute instructions to process information;
a memory interfaced with the processor and operable to store the instructions and information;
a time-of-flight sensor operable to detect distance to an object;
an image sensor operable to capture light as visual information;
an image signal processor interfaced with the image sensor and operable to define a visual image as an array of pixel values from the visual information;
a lens aligned with the image sensor to direct light at the image sensor;
an actuator coupled to the lens to adjust the lens position relative to the image sensor to focus the light at the image sensor; and
a non-transitory memory storing instructions that when executed cause:
detection by the time-of-flight sensor of a distance to the object;
validation of the distance to the object;
lookup in focal point table of an actuator position associated with focus by the lens on the object for the distance;
actuation of the actuator to the actuator position; and
capture of a visual image at the image sensor by the image signal processor;
wherein the validation comprises analysis of the distance of the time-of-flight sensor compared against expected time-of-flight distances of facial features.

2. The information handling system of claim 1 further comprising:
a thermistor operable to measure a temperature associated with the lens; and
a temperature adjustment stored in the focal point table to adjust the actuator position based upon the temperature.

3. The information handling system of claim 2 wherein the capture of the visual image is executed without image-based focus analysis.

4. The information handling system of claim 1 wherein the validation comprises analysis of a size of the object indicated by the time-of-flight sensor compared against an amount of a field of view of the lens of the object.

5. The information handling system of claim 1 wherein the instructions further:
select a first actuator position within a first predetermined portion of the lens depth of field;
capture first visual information;
select a second actuator position within a second predetermined portion of the lens depth of field;
capture second visual information; and
compare the first visual information and the second visual information to confirm lens focus.

6. The information handling system of claim 5 wherein the first visual information and second visual information are compared by contrast detection autofocus.

7. The information handling system of claim 5 wherein the first visual information and second visual information are compared by phase detection autofocus.

8. The information handling system of claim 5 wherein:
the first actuator position is one table increment closer than the actuator position associated with focus for the distance; and
the second actuator position is the actuator position associated with focus for the distance.

9. A method for capturing a visual image with a camera comprising:
detecting by a time-of-flight sensor of a distance to an object;
validating the distance to the object, the validating including at least analysis of a size of the object indicated by the time-of-flight sensor compared against an amount of a field of view of the lens of the object;
looking up in a focal point table of an actuator position associated with focus by a lens on the object for the distance;
actuating of the actuator to the actuator position; and
capturing a visual image at an image sensor by an image signal processor of light passing through the lens focused on the object.

10. The method of claim 9 further comprising:
measuring a temperature associated with the lens; and
applying a temperature adjustment to the focal point table to determine the actuator position based upon the temperature.

11. The method of claim 10 further comprising capturing the visual images without image-based focus analysis.

12. The method of claim 10 further comprising:
selecting a first actuator position within a first predetermined portion of the lens depth of field;
capturing a first visual information;
selecting a second actuator position within a second predetermined portion of the lens depth of field;
capturing a second visual information; and
comparing the first visual information and the second visual information to confirm lens focus.

13. The method of claim 12 wherein the first visual information and second visual information are compared by contrast detection autofocus.

14. The method of claim 12 wherein the first visual information and the second visual information are compared by phase detection autofocus.

15. The method of claim 12 wherein:
the first actuator position is one table increment closer than the actuator position associated with focus for the distance; and
the second actuator position is the actuator position associated with focus for the distance.

16. A camera comprising:
a time-of-flight sensor operable to detect distance to an object;
an image sensor operable to capture light as visual information;
an image signal processor interfaced with the image sensor and operable to define a visual image as an array of pixel values from the visual information;
a lens aligned with the image sensor to direct light at the image sensor;
an actuator coupled to the lens to adjust the lens position relative to the image sensor to focus the light at the image sensor; and
a non-transitory memory storing instructions that when executed cause:
detection by the time-of-flight sensor of a distance to the object;
validation of the distance to the object;

lookup in focal point table of an actuator position associated with focus by the lens on the object for the distance;

actuation of the actuator to the actuator position; and capture of a visual image at the image sensor by the image signal processor;

wherein the instructions further:

select a first actuator position within a first predetermined portion of the lens depth of field;

capture first visual information;

select a second actuator position within a second predetermined portion of the lens depth of field;

capture second visual information; and compare the first visual information and the second visual information by phase detection autofocus to confirm lens focus.

17. The camera of claim 16 further comprising:

a thermistor operable to measure a temperature associated with the lens; and a temperature adjustment stored in the focal point table to adjust the actuator position based upon the temperature.

18. The camera of claim 17 wherein the capture of the visual image is executed without image-based focus analysis.

* * * * *